Jan. 12, 1965    J. P. WHITE    3,165,650
MAGNETIC MULTIPLIER SYSTEM
Filed Oct. 2, 1962
Fig. 1
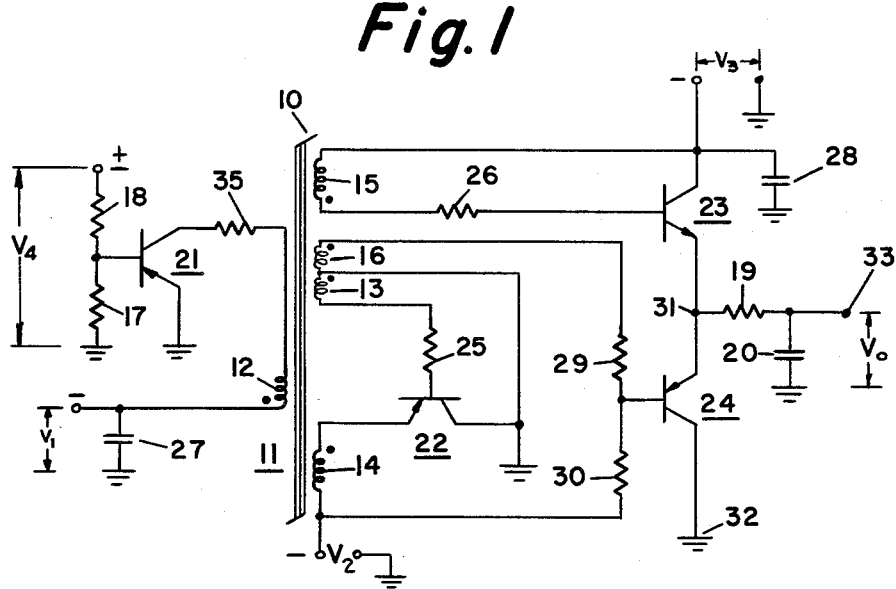
Fig. 2
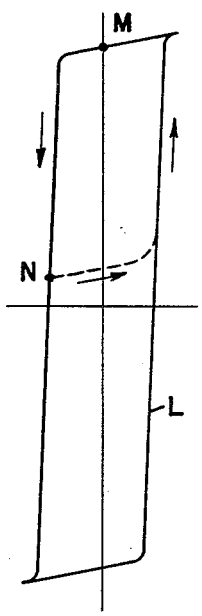
Fig. 3A
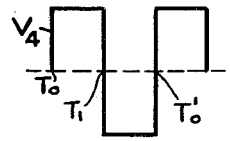
Fig. 3B
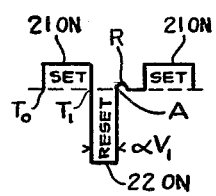
Fig. 3C
Fig. 3D
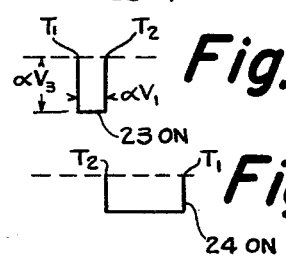

United States Patent Office 3,165,650
Patented Jan. 12, 1965

3,165,650
MAGNETIC MULTIPLIER SYSTEM
James Paul White, Norristown, Pa., assignor to Leeds and Northrup Company, Philadelphia, Pa., a corporation of Pennsylvania
Filed Oct. 2, 1962, Ser. No. 227,900
8 Claims. (Cl. 307—88.5)

This invention relates to magnetic multipliers of the type utilizing a saturable core transformer, transistors or equivalent solid-state switching devices and an integrating circuit to produce an output voltage varying as a function of the produce of at least two input voltages.

The invention is particularly concerned with an improved magnetic multiplier modified to insure a linear relationship between the integrated output voltage and the input voltages producing it with substantial correction of residual voltage and flux effects respectively due to characteristics of the integrating circuit and the saturable core.

More specifically, the transformer core is driven from magnetic saturation in one sense toward saturation in opposite sense during periodic conduction intervals of a first transistor by current pulses supplied to one winding of the core from one of the input voltages to be multiplied. When the first transistor becomes non-conductive, a second transistor connected to a pair of core windings is switched to conductive state, and by virtue of a regenerative action resets the core to its original state and switches itself off after a time interval proportional to the magnitude of the aforesaid input voltage. During the core-resetting interval, a third transistor connected to a core winding is in conductive state to apply to the integrating circuit a voltage pulse whose amplitude corresponds with the magnitude of a second input voltage and whose duration corresponds with the magnitude of the first input voltage. Upon completion of the core reset, a fourth transistor, controlled by another core winding and a D.C. bias circuit, is switched to conductive state to drain off the residual charge of the integrating circuit and so insure a substantially linear relationship between the output voltage and both of the input voltages. The invention also concerns correction of a measurement error due to a core relaxation flux change and simulating a higher than proper value of one of the input voltages. In the modified multiplier, such error is substantially completely corrected by inclusion of a compensating resistor in the core-driving circuit including the first-mentioned transistor.

The invention further resides in a magnetic multiplier having novel and useful features of combination and arrangement hereinafter described and claimed.

For a more detailed understanding of the invention, reference is made to the following description of a preferred embodiment thereof and to the accompanying drawings in which:

FIG. 1 is a schematic circuit diagram of a magnetic multiplier system incorporating the inventive improvements;

FIG. 2 shows a typical core magnetization curve referred to in discussion of the operation of the system of FIG. 1; and FIGS. 3A–3D are explanatory figures showing time relationships between the conductive periods of the switching transistors of FIG. 1.

The magnetic multiplier system shown in FIG. 1 comprises a transformer 11 whose saturable core 10 is provided with a plurality of windings 12–16 magnetically coupled to each other and in circuit with solid-state switching devices exemplified by transistors 21–24. With the input voltage $V_2$ fixed in magnitude, the output voltage $V_0$ of the system as appearing across the output terminals of the integrating circuit 19–20 is proportional to the product of voltages $V_1$ and $V_3$. The magnitudes of these input voltages may be representative of measured variables such as pressure, temperature, pH, frequency, generation or other physical, chemical or electrical condition involved in control computations or analyses. With voltage $V_2$ also varied in accordance with a measured variable, the output voltage $V_0$ additionally varies as an inverse function of voltage $V_2$.

The winding 12 of transformer 11 is connected in the output or emitter-collector circuit of transistor 21 in series with a source of D.C. voltage $V_1$. The voltage source is preferably shunted by a smoothing capacitor 27. The transistor 21 is alternately switched to conductive and non-conductive states at constant repetition frequency, for example, 60 cycles per second, as by a squarewave voltage $V_4$. Specifically, the voltage $V_4$ is applied to a potential-divider circuit 17–18 whose resistor 17 is connected between the input or base and emitter electrodes of transistor 21.

The winding 13 of transformer 11 is connected in the input or base-collector circuit of transistor 22 in series with resistor 25. The winding 14 of transformer 11 is connected in the output or emitter-collector circuit of transistor 22 in series with the source of voltage $V_2$. The windings 13–14 are poled in sense affording a regenerative action later discussed.

The winding 15 of transformer 11 is connected in series with resistor 26 in the input circuit of transistor 23. The output circuit of transistor 23 includes the source of voltage $V_3$ in series with the resistor 19 and capacitor 20 of the integrator circuit. The variable input voltage $V_3$ is preferably shunted by the smoothing capacitor 28. The input terminals 31, 32 of the integrator circuit are connected to the output or emitter and collector electrodes of transistor 24.

The winding 16 of transformer 11 is connected in the input circuit of transistor 24 in series with the resistor 29 of the potential-divider circuit 29–30. The winding 16 and resistors 29, 30 are connected in series with a source of D.C. bias voltage. In applications of the system for which voltage $V_2$ is one of the measured variables and varies only in a limited range, it may still serve as such source of biasing voltage: otherwise, a separate D.C. voltage similarly poled and of similar magnitude is used.

For purposes of explanation, it is assumed that at the beginning of each cycle of the squarewave voltage $V_4$ the core 10 of transformer 11 is saturated in positive direction or sense, i.e., that its residual flux density is at a maximum corresponding with or closely approximating point M of FIG. 2. During the first halfwave of each cycle, the voltage $V_4$ is effective to switch the transistor 21 to conductive state so that during the corresponding time interval $T_0$–$T_1$ (FIGS. 3A, 3B), the voltage $V_1$ is effective to excite the transformer winding 12 by a current pulse which drives the core flux away from the value M to a less positive or more negative saturation value, for example, to the value N (FIG. 2). It will be understood that the greater the magnitude of voltage $V_1$, the greater the extent to which the core is driven toward saturation in the reverse or negative sense for the major hysteresis loop L. Consequently, it will be understood that for a given core and given driving winding 12 that the range of variation of voltage $V_1$ should not exceed that for which the core is driven to saturation in the opposite or negative sense.

Upon termination of the halfwave interval $T_0$–$T_1$, the transistor 21 becomes non-conductive and the inductive kick, due to termination of current in winding 12, induces in the core winding 13 a voltage which is effective to switch the transistor 22 to conductive state. The resulting change in core flux density, due to flow of current from source $V_2$ through winding 14, is in the core-resetting sense and also in sense such that the voltage induced in coil 13 insures continued conduction by transistor 22. Because of such regenerative action, the core density is returned to positive saturation, at which time the regenerative action ceases and transistor 22 becomes non-conducting. The time interval $T_1$–$T_2$ required to reset the core corresponds with the magnitude of the core-driving voltage $V_1$.

During resetting of the core 10, the transistor 23 is switched to the conductive state by voltage induced in winding 15 (FIG. 3C). Thus, during the time interval for which transistor 24 is non-conductive, a voltage pulse of amplitude $V_3$ is applied to the input terminal 31, 32 of the integrator circuit 19, 20. Since the duration of the pulse is proportional to $V_1$ and the height of the pulse is proportional to $V_3$, its integrated D.C. component $V_0$ as appearing at the output terminal 33, 32 of the integrator circuit is proportional to each of the two input voltages $V_1$, $V_3$ and to their product. Such proportionality for successive cycles of the switching voltage $V_4$ is predicated upon the condition precedent that essentially no voltage appears at the input terminals 31, 32 of the integrator circuit during the non-conductive periods of transistor 23.

Such condition is insured in the multiplier system of FIG. 1 by the provision of transistor 24 and the associated circuitry which provides that transistors 23 and 24 are always in opposite state. More particularly, during resetting of the core, the transistor 24 is maintained in non-conductive state by the net effect of the voltage induced in winding 16 and the D.C. bias. Thus, during the interval for which transistor 23 is conductive, the transistor 24 appears as an extremely high impedance across the input terminals 31, 32 of the integrator circuit 19, 20 with correspondingly negligible attenuation of the output voltage pulse $V_0$. Upon completion of resetting of the core 10, the transistor 24 switches to conductive state and so appears as an extremely low impedance across the input terminal 31, 32 of the integrator network. Consequently, the input voltage at 31, 32 of the integrator network falls to essentially zero value between the successive input pulses with the result that $V_0$ across the output terminals is a true time average of such pulses ($V_1$–$V_3$).

With the improved multiplier system as thus far described, the output voltage $V_0$ tends to be higher than expected. It was determined that this error corresponded to an apparent zero shift of voltage $V_1$, which causes transistor 23 to be conductive for a longer interval than expected. It was deduced that such error was due to the difference between the saturation flux density of the driven core and the resulting residual flux density. From oscilloscope tests made with an additional pickup winding on core 10, there was observed the small pulse R (FIG. 3B) immediately following the point A at which resetting of the core is complete. This pulse, which is due to a relaxation flux change, is in the same sense as the driving flux change later occurring when transistor 21 is switched to conductive state. Such pulse is therefore responsible for the apparent zero shift of voltage $V_1$ causing the product or output voltage $V_0$ to be high. This core error is compensated to large degree in the system of FIG. 1 by including resistor 35 of suitable magnitude in series with the core-driving winding 12 and the source of voltage $V_1$. The effect of such resistor corresponds with a reduction of voltage $V_1$ as appearing across winding 12. Accordingly, there is corresponding reduction of the flux change set into the core when transistor 21 conducts and hence a reduction of the reset time of the core and of the time interval for which transistor 23 is conductive.

Suitable components and parameters of a magnetic multiplier embodying the circuitry of FIG. 1 are given in Table A below:

Table A

Transformer 11: Arnold No. 3T4635–D2 (Deltamax tape wound core)
Winding 12—1365 turns
Winding 13—357 turns
Winding 14—1786 turns
Winding 15—95 turns
Winding 16—595 turns
Transistors 21, 22, 24: type 2N1305
Transistor 23: type 2N1308

Resistors:
17—1.5 KΩ
18—5.6 KΩ
19—10 KΩ
25—1.2 KΩ
26—27Ω
29—1.8 KΩ
30—10 KΩ

Capacitors:
20—50 μf.
27—25 μf.
28—25 μf.

Input voltages:
$V_1$—0 to 10 v.
$V_2$—15 v. fixed
$V_3$—0 to 10 v.

Under substantially constant conditions of ambient temperature and connected load and with the input voltages $V_1$, $V_3$ varying in the range of from about 0.8 volt to 10 volts, the differences between the calculated product of the voltages $V_1$, $V_3$ and the measured product $V_0$ were not greater than 0.05% of maximum output: furthermore, with input voltages as low as 0.1 volt, the error was not more than about 0.87%. Any two or all three of the voltages $V_1$, $V_2$ and $V_3$ may vary as a function of a corresponding measured variable. As indicated above, for a given core 10 and driving coil 12, the maximum value of $V_1$ may not exceed the magnitude which drives the core from saturation in one direction to saturation in the opposite direction: also the maximum value of $V_3$ should not exceed the breakdown value of transistor 23 or transistor 24: the minimum value of $V_2$ should be sufficient for complete resetting of the core and the maximum value should not exceed the breakdown value of transistor 22. Voltage $V_2$, for example, may be made to vary as a function of temperature in compensation for temperature error of the transducer or transducers which produce the voltage $V_1$ and/or $V_3$.

It is also pointed out that although the emitter and collector connections shown are the preferred ones, it is possible to reverse them. For example, the output circuit connections of transistor 21 and/or 23 may be interchanged to obtain a lower saturation voltage.

It will be understood that the invention is not limited to the specific arrangements shown but comprehends modifications within the scope of the appended claims.

What is claimed is:

1. A magnetic multiplier system for producing an output voltage linearly proportional to the product of at least two variable D.C. input voltages which comprises
a saturable core transformer having a plurality of windings,
means for driving said core away from saturation in one sense comprising a first solid-state switching device whose input circuit includes a source of switching pulses of fixed frequency and duration and whose output circuit includes one of said windings in series with one of said input voltages,
means for resetting said core comprising a second solid-state switching device including a pair of said windings respectively in its input and output circuits and regeneratively coupled, the voltage pulse induced in one winding of said pair when said first solid-state switching device becomes non-conductive effecting switching of said second solid-state switching device to conductive state and the resulting current in the other of said pair of windings resetting said core after a time interval proportional to said one of the input voltages, a third solid-state switching device whose output circuit includes an integrating network in series with the other of said input voltages, a fourth solid-state switching device whose output electrodes are connected directly across the input terminals of said integrating network, and means including a pair of said windings respectively included in the input circuits of said third and fourth solid-state switching devices for respectively switching them to conductive and non-conductive states during resetting of said core to supply to said integrating circuit a current pulse whose time duration is proportional to said one of the input voltages and whose amplitude is proportional to said other of the input voltages and for respectively switching them to non-conductive and conductive states upon completion of resetting of said core to insure the output voltage of said integrating circuit is the time-average of the pulses supplied to said integrating circuit.

2. A magnetic multiplier system for producing an output voltage linearly proportional to the product of at least two variable D.C. input voltages which comprises a saturable core transformer having a plurality of windings, means for driving said core away from saturation in one sense comprising a first solid-state switching device whose input circuit includes a source of switching pulses of fixed frequency and duration and whose output circuit includes one of said windings in series with one of said input voltages, means for resetting said core comprising a second solid-state switching device including a pair of said windings respectively in its input and output circuits and regeneratively coupled, the voltage pulse induced in one winding of said pair when said first solid-state switching device becomes non-conductive effecting switching of said second solid-state switching device to conductive state and the resulting current in the other of said pair of windings resetting said core after a time interval proportional to said one of the input voltages, a third solid-state switching device whose output circuit includes an integrating network in series with the other of said input voltages and whose input circuit includes another of said windings, said third device being switched to conductive state during resetting of the core and to non-conductive state when said second device switches to non-conductive state, a fourth solid-state switching device whose output electrodes are connected directly across the input terminals of said integrating network, and means for switching said fourth device to conductive and non-conductive states respectively concurrently with switching of said third device to non-conductive and conductive states respectively.

3. A magnetic multiplier system as in claim 2 additionally including a compensating resistor in the output circuit of said first solid-state switching device in series with said one of said windings and said one of the input voltages substantially to correct for the effect upon reset time of the difference between the saturation flux density of the core and the residual flux density.

4. A magnetic multiplier system for producing an output voltage linearly proportional to the product of at least two variable input voltages which comprises a saturable core transformer having a plurality of windings, a first switching transistor having an output circuit including one of said windings and the source of the first of said two variable input voltages, means for supplying pulses of fixed frequency and duration to the input circuit of said first switching transistor having an output circuit including to non-conductive state, said first transistor while conductive passing a current pulse from said first source through said first winding to drive the core of said transformer from saturation in one sense, a second switching transistor having two other of said windings respectively in its input and output circuits, said second transistor being switched to conductive state by the voltage pulse supplied thereto by one of said two windings when said first transistor becomes non-conducting and remaining conductive for a time proportional to the magnitude of said first input voltage during resetting of the core, a third switching transistor including another winding of said transformer in its input circuit and the source of the second input voltage in its output circuit, said third transistor becoming conductive during each resetting of said core to pass an output pulse of magnitude corresponding with said second input voltage and of duration corresponding with said first input voltage, an R-C circuit for integrating the output current pulses of said third transistor, and a fourth switching transistor whose output circuit is in shunt to said integrating circuit and whose input circuit is coupled to one of said windings, said fourth transistor being conductive when said third transistor is non-conductive to insure that the output voltage of said integrator circuit is linear with respect to both of said input voltages.

5. A magnetic multiplier system as in claim 4 additionally including a compensating resistor in the output circuit of said first switching transistor to correct for an output voltage error due to a relaxation change of the flux density of the core occurring upon completion of resetting of the core.

6. A magnetic multiplier circuit comprising a saturable core transformer having a plurality of windings, a first switching transistor having serially connected in its collector-emitter circuit a first of said windings and a first input voltage source of fixed polarity and variable magnitude, and having in its base-emitter circuit means for applying switching pulses of fixed frequency and duration, a second switching transistor having the second of said windings in its base-collector circuit and the third of said windings in its emitter-collector circuit in series with a voltage source of fixed polarity and magnitude, a third switching transistor having the fourth of said windings in its base-collector circuit, a fourth switching transistor having its emitter-collector circuit in series with the emitter-collector circuit of said third transistor and a second input voltage source of fixed polarity and variable magnitude, an R-C integrator circuit connected to the emitter and collector of said fourth transistor, and means for coupling the base-collector circuit of said fourth transistor to anohter of said windings to effect switching of said fourth transistor to conductive state when said third transistor is in non-conductive state, the integrated output voltage of said integrator circuit being a linear function of the product of said variable input voltages.

7. A magnetic multiplier system for producing an output voltage ($V_0$) proportional to the product $$\left(V_1 \cdot V_3 \cdot \frac{1}{V_2}\right)$$

where any one or more of the input voltages $V_1$, $V_2$, $V_3$ may be variable which comprises, a saturable core transformer having a plurality of windings, means for driving said core away from saturation in one sense comprising a solid-stateswitching device whose input circuit includes a source of switching pulses of fixed frequency and duration and whose output circuit includes one of said core windings in series with one of said input voltages ($V_1$), means for resetting said core comprising a second solid-state switching device having a second of said input voltages ($V_2$) in series with another of said core windings, a third solid-state switching device whose output circuit includes an averaging network in series with a third of said input voltages ($V_3$), a fourth solid-state switching device whose output electrodes are connected across the input terminals of said averaging network, and means including a pair of said core windings respectively in the input circuits of said third and fourth solid-state switching devices for respectively switching them to conductive and non-conductive states during resetting of said core to supply to said averaging circuit a voltage pulse whose time duration is proportional to the product $$V_1 \cdot \frac{1}{V_2}$$

and whose amplitude is proportional to voltage $V_3$ and for respectively switching them to non-conductive and conductive states upon completion of resetting of said core to insure the output voltage of said averaging circuit is the time average of the pulses supplied to said averaging circuit.

8. A magnetic amplifier system comprising a saturable core transformer, means for driving said core from saturation in one sense comprising a solid-state switching device whose input circuit includes a source of switching pulses of fixed frequency and duration and whose output circuit includes an input voltage and a core winding, means including a second solid-state device for resetting the core to original state in the intervals between successive switching pulses, said resetting being accompanied by a flux change in excess of the residual flux density, a third solid-state switching device whose input circuit includes one of said core windings and whose output circuit includes a voltage source in series with an averaging circuit, said third switching device being conductive during resetting of said core, and a compensating resistor in said output circuit of said first switching device substantially to correct for the effect upon reset time of said excess flux change.

No references cited.

UNITED STATES PATENT OFFICE
CERTIFICATE OF CORRECTION

Patent No. 3,165,650             January 12, 1965

James Paul White

It is hereby certified that error appears in the above numbered patent requiring correction and that the said Letters Patent should read as corrected, below.

Column 1, line 13, for "produce" read -- product --; column 6, line 7, strike out "first switching transistor having an output circuit including" and insert instead -- first transistor alternately to switch it from conductive --; line 58, for "anohter" read -- another --.

Signed and sealed this 23rd day of November 1965.

(SEAL)
Attest:

ERNEST W. SWIDER             EDWARD J. BRENNER
Attesting Officer             Commissioner of Patents